US006954016B2

(12) United States Patent
Ueda et al.

(10) Patent No.: US 6,954,016 B2
(45) Date of Patent: Oct. 11, 2005

(54) VIBRATING ACTUATOR AND A POWER SUPPLY MECHANISM THEREOF

(75) Inventors: Minoru Ueda, Adachi-ku (JP); Tsuneo Kyono, Adachi-ku (JP); Teruo Yoshinari, Adachi-ku (JP); Fumio Funjimori, Adachi-ku (JP)

(73) Assignee: Namiki Seimitsu Hoseki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/653,890

(22) Filed: Sep. 4, 2003

(65) Prior Publication Data

US 2004/0119343 A1 Jun. 24, 2004

Related U.S. Application Data

(62) Division of application No. 09/958,756, filed as application No. PCT/JP00/02446 on Apr. 14, 2000, now Pat. No. 6,753,630.

(30) Foreign Application Priority Data

| | | |
|---|---|---|
| Apr. 16, 1999 | (JP) | 11-108847 |
| Aug. 31, 1999 | (JP) | 11-245729 |
| Aug. 31, 1999 | (JP) | 11-245730 |
| Sep. 8, 1999 | (JP) | 11-253857 |

(51) Int. Cl.[7] .......... H02K 7/06
(52) U.S. Cl. .......... 310/81; 310/71
(58) Field of Search .......... 310/71, 81, 89; 439/78, 83

(56) References Cited

U.S. PATENT DOCUMENTS

| | | | | |
|---|---|---|---|---|
| 5,894,263 A | | 4/1999 | Shimakawa et al. | |
| 6,066,999 A | * | 5/2000 | Pischinger | 335/266 |
| 6,093,036 A | * | 7/2000 | Tohgo et al. | 439/83 |
| 2003/0072441 A1 | * | 4/2003 | Kobayashi et al. | 379/431 |

FOREIGN PATENT DOCUMENTS

| | | | | |
|---|---|---|---|---|
| JP | 8-140301 A | | 5/1996 | |
| JP | 10-117460 A | | 5/1998 | |
| JP | 10117460 A | * | 5/1998 | H02K/7/065 |
| JP | 11-18182 A | | 1/1999 | |
| JP | 2000-23440 A | | 1/2000 | |

OTHER PUBLICATIONS

International Search Report dated Jul. 18, 2000.

International Preliminary Examination Report dated Dec. 12, 2001.

* cited by examiner

*Primary Examiner*—Thanh Lam
(74) *Attorney, Agent, or Firm*—Eric J. Robinson; Robinson Intellectual Property Law Office, P.C.

(57) ABSTRACT

An improved vibrating actuator for notifying the user of a call upon signal arrival by any of a buzzer, a speech and a vibration, and a power supply mechanism thereof. The device has high impact resistance by a magnetic yoke having a flange, a damper material is provided between an oscillation plate and a cover to prevent generation of noise, and a hole is provided in the cover to change acoustic characteristics as required within the same frequency band. As a power supply mechanism for ensuring electrical connection, a projecting electrical connection terminal is provided on the actuator side, and a conductive material touching with the electrical connection terminal is provided as a power supply terminal electrically connected to a power supply section of a circuit board.

7 Claims, 22 Drawing Sheets

VIBRATING ACTUATOR AND A POWER SUPPLY MECHANISM THEREOF

INDUSTRIAL FIELD OF INVENTION

The present invention concerns an improved vibrating actuator and a power supply mechanism thereof, comprising a call notification means that notifies of a call upon signal arrival by any of a buzzer, speech or vibration, and a portable electronic device such as a pager or a portable telephone.

BACKGROUND TECHNOLOGY

Generally, a vibrating actuator fitted to a portable electronic device is provided with a coil for current application, a diaphragm fastened at one side of the coil, a magnet to form a magnetic circuit, a magnetic yoke supporting this magnet, and an oscillation plate that supports this magnetic yoke. A diaphragm is mounted within the frame of a case by a lip with a magnetic gap between the coil and the magnetic yoke, and an oscillation plate is mounted within the frame of the case at an edge. A cover over the mounting side of an oscillation plate is fitted to the case. Vibration is generated from the oscillation plate at low frequency by the action of current applied to a coil and a magnetic field of a magnet while a sound is issued from the diaphragm at high frequency.

This type of vibrating actuator must have high impact resistance so that it does not break even if dropped by a user. A means of imparting such impact resistance is to mount a projection from the side wall of the case to the interior to function as a stopper that contacts the magnetic yoke should it swing violently due to impact.

Expansion of the frame diameter of the case is inhibited to the extent that a projection is mounted in this vibrating actuator, and a comparatively thick magnetic yoke is provided because of the need to ensure a weight sufficient to actuate the oscillation plate. Consequently, actuators are limited to thin ones.

Furthermore, when impact is applied, it is transmitted from the cover to the oscillation plate, causing the oscillation plate to deform which causes noise due to abnormal vibration.

In addition, the coil and the power supply section of the circuit board are connected by using a flexible cord as the wiring that applies current to the coil, but even if they are connected by this flexible cord, there is a fear of disconnection of the flexible cord at the connection terminal because of the application of a load to the connection terminal of the lead line accompanying vibration during operation.

An expansion of the utility of aforementioned vibrating actuator is desired as a product by altering the acoustic characteristics at a given frequency band.

DISCLOSURE OF INVENTION

The present invention concerns a vibrating actuator provided with a coil for applying current, a diaphragm fastened at one side of the coil, a magnet to form a magnetic circuit, a magnetic yoke supporting this magnet, and an oscillation plate that supports this magnetic yoke, wherein a diaphragm is mounted within the frame of a case by a lip with a magnetic gap between the coil and the magnetic yoke, an oscillation plate is mounted within the frame of the case at an edge, and said actuator operates the diaphragm and oscillation plate by the attraction/repulsion of magnetism of the magnet and magnetism of the coil, as well as an improved power supply mechanism for said vibrating actuator.

The objective of the present invention is to provide a vibrating actuator having high impact resistance that can be constructed so as to be thin overall.

To attain aforementioned objectives, the present invention is provided with a magnetic yoke having a protruding flange, an oscillation plate that supports this magnetic yoke with the flange appropriately positioned at the base, the oscillation plate being fastened to the magnetic yoke with the central part of each support arm that is disposed on the side facing aforementioned oscillation plate being appropriately positioned relative to the flange, and a concave case that accepts the flange.

Another objective of the present invention is to provide a vibrating actuator that prevents impact applied to the case from affecting the oscillation plate via the cover and to prevent the generation of noise through deformation of the oscillation plate. The objective is attained by providing a vibration control damper between the oscillation plate and the cover.

In addition, the present invention provides a power supply mechanism for the vibrating actuator that reliably provides an electrical connection without disconnection due to vibration during operation. To attain the objective, a projecting electrical connection terminal is mounted on the actuator side and the conductive material in contact with said electrical connection terminal is mounted as a power supply terminal that connects with the power supply section of the circuit board.

In addition, the present invention provides a vibrating actuator structured to suitably change the acoustic characteristics as required even at a given frequency band. The cover is structured with vent holes to attain the objective.

BEST MODE FOR IMPLEMENTING THE PRESENT INVENTION (Embodiment 1)

Figure 1:
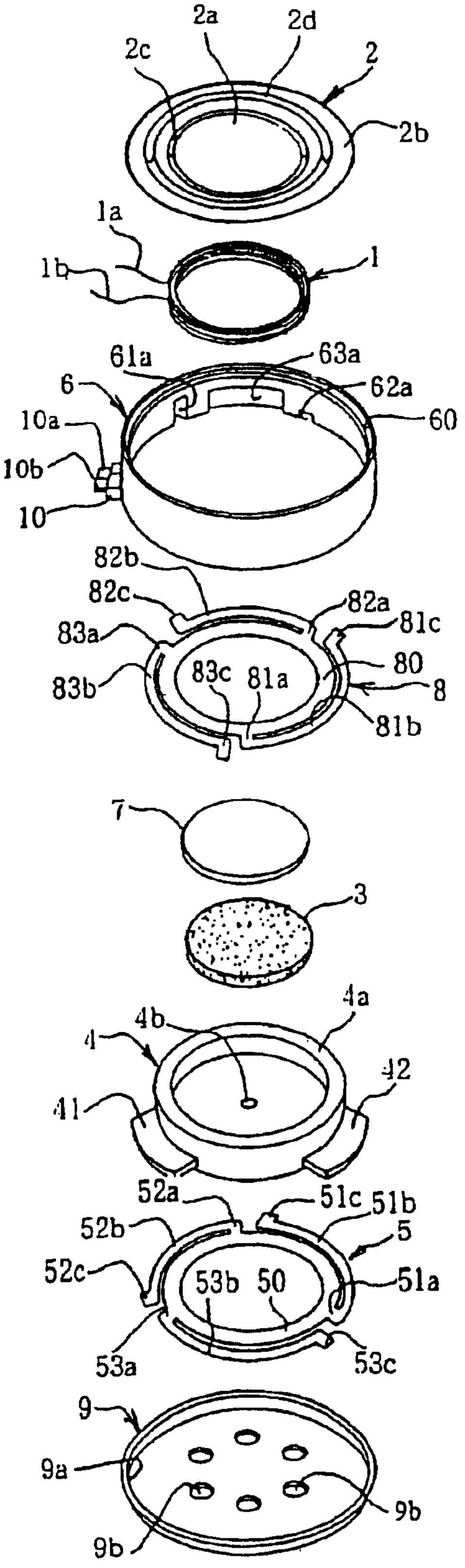
FIG. 1 is an expanded perspective diagram showing each part comprising the vibrating actuator in Embodiment 1 of the present invention.
Figure 2:
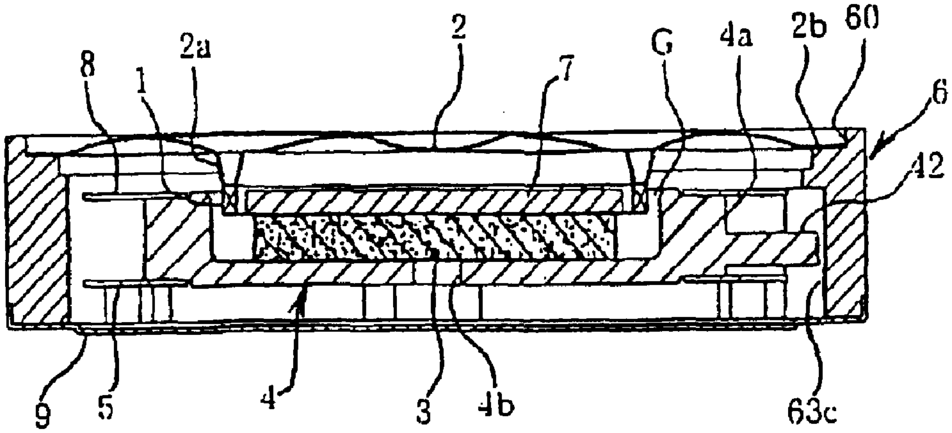
FIG. 2 is a sectional side elevation showing the same vibrating actuator.

Embodiment 1 of the present invention is explained below with reference to FIGS. 1 to 17. The vibrating actuator shown in FIG. 1 is provided with coil 1 for applying current, diaphragm 2 that fastens coil 1, magnet 3 for formation of a magnetic circuit, magnetic yoke 4 that holds magnet 3, and oscillation plate 5 that supports magnetic yoke 4. Each of these is assembled within the frame of case 6.

In addition to aforementioned constituent units in the mode of the embodiment that is presented here, this unit is also provided with disk-shaped pole piece 7 that overlaps the top of magnetic yoke 4, oscillation plate 8 that is assembled on the opposite side from oscillation plate 5 relative to magnetic yoke 4 supporting magnet 3, and metal cover 9 that is fitted to the frame on the opposite side from the frame of case 6 that engages diaphragm 2.

A circular voice coil to which high frequency current or low frequency current is selectively applied is mounted as coil 1. The round surface of coil 1 is fastened on one side of diaphragm 2 by contacting the protruding surface of the protrusion discussed below. In addition, the terminals of coil 1 are lead lines 1*a*, 1*b* that are electrically connected to an external terminal discussed below.

Diaphragm 2 is formed into a thin, flexible, deformable disc shape from resin such as polyetherimide (PEI). In diaphragm 2, protrusion 2*a* having a prescribed projection height is supported and fastened to coil 1, and rib 2*d* that partitions peripheral edge 2*b*, which is fitted to the steps of case 6 discussed below, from flexible deforming vibrating section 2*c* is installed concentrically over the disc surface.

Disc-shaped material is furnished as magnet 3. Magnet 3 is attached and mounted on the inside of magnetic yoke 4 with pole piece 7 overlapping the upper side. Magnetic yoke 4 is formed into U shape having outer peripheral edge 4*a*. In addition, perforation hole 4*b* is installed in the bottom center of magnetic yoke 4.

Figure 3:
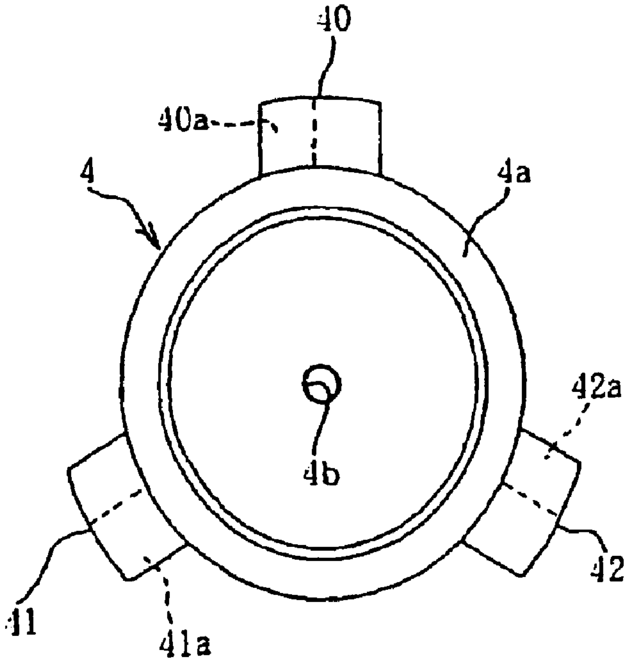
FIG. 3 is a planar figure showing the magnetic yoke of the same vibrating actuator.

Flanges 40, 41, 42 are attached on magnetic yoke 4 facing the inner wall surface of case 6 from outer peripheral edge 4*a* to serve as stoppers for impact resistance. These three flanges 40, 41, 42 are mounted at uniform separations in the circumferential direction on outer peripheral edge 4*a* to uniformly balance magnetic yoke 4 with relation to the shape of oscillation plates 5 and 8, as shown in FIG. 3.

Figure 4:
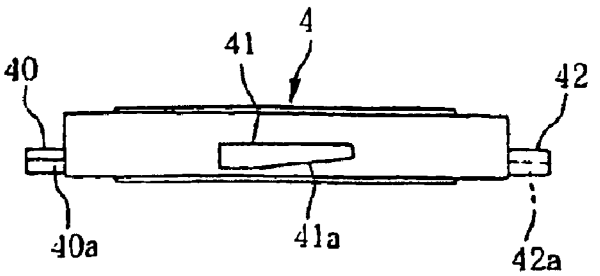
FIG. 4 is a side view showing the magnetic yoke of the same vibrating actuator.

Since each of these flanges 40, 41, 42 is attached to the side opposite from oscillation plate 8, as shown in FIG. 4, the attachment side approaches oscillation plate 5 and they are installed so as to protrude toward the inner wall surface of case 6 from outer peripheral edge 4*a*. In addition, each half 40*a*–42*a* from roughly the center in the projection direction of flanges 40, 41, 42 is formed so that the plate thickness would become thinner on the slanted surface from the side on the attachment side of oscillation plate 5.

In addition to acting as an impact resistance stopper, the flanges 40, 41, 42 match the overall weight of magnetic yoke 4 and a thinner magnetic yoke 4 than had been used could be employed since they are installed to permit the overall thickness of magnetic yoke 4 to be thinner.

Oscillation plate 5 is molded from a thin plate of metal such as stainless steel or an alloy of copper and titanium having spring properties. Oscillation plate 5 comprises ring-shaped inner ring plate 50, bases 51*a*, 52*a*, 53*a* whose edges are separated uniformly in the circumferential direction of inner ring plate 50, a plurality of concentric support arms 51*b*, 52*b*, 53*b* extending from bases 51*a*, 52*a*, 53*a* and projections 51*c*, 52*c*, 53*c* of the arm edges that attach each of the support arms 51*b*, 52*b*, 53*b* to the inner wall surface of case 6.

Figure 5:
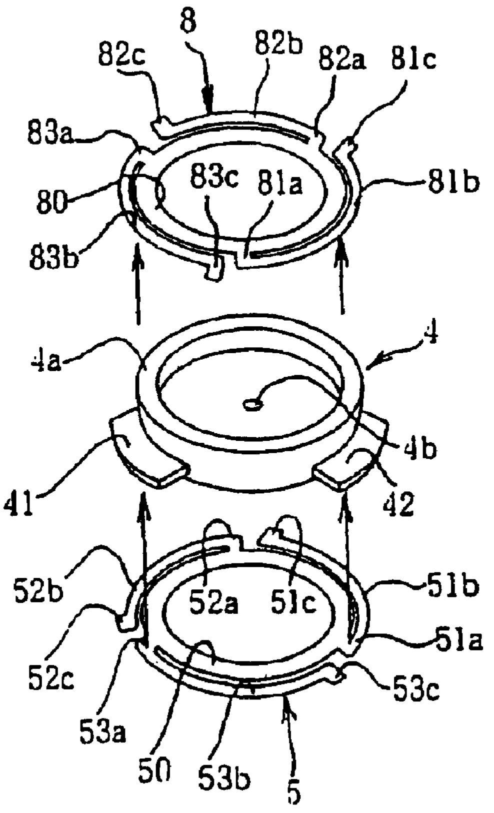
FIG. 5 is an extracted perspective diagram showing the spatial relationship between the oscillation plate and the magnetic yoke comprising the vibrating actuator.

Magnetic yoke 4 supporting magnet 3 is attached to inner ring plate 50 of oscillation plate 5. As shown in FIG. 5, roughly the center of each of these flanges 40, 41, 42 of magnetic yoke 4 is placed to meet each of the bases 51*a*, 52*a*, 53*a* of oscillation plate 5, and each half 40*a*–42*a* of the slanted surface from roughly the center is placed to meet each of the support arms 51*b*, 52*b*, 53*b* of oscillation plate 5 so as to fasten it to inner ring plate 50 of oscillation plate 5.

Through this disposition of magnetic yoke 4, each of the bases 51*a*, 52*a*, 53*a* of oscillation plate 5 would be a portion which is resistant to sagging even if each of flanges 40, 41, 42 should be attached and which oscillation plate 5 shifts to the attachment side. Projections 51*c*, 52*c*, 53*c* are attached to case 6 and each of support arms 51*b*, 52*b*, 53*b* is placed to meet each half 40*a*–42*a* of the slanted surface from roughly the center of each of flanges 40, 41, 42. Consequently, even if oscillation plate 5 should sustain impact and flex, contact with each of flanges 40, 41, 42 of magnetic yoke 4 would be avoided, as shown in FIG. 6 (in the center of flange 41).

In addition to oscillation plate 5 that supports magnetic yoke 4, it is also provided with oscillation plate 8 that is disposed so as to fasten magnetic yoke 4 on the opposite side. Oscillation plate 8 also comprises ring-shaped inner ring plate 80, bases 81*a*, 82*a*, 83*a* whose edges are separated uniformly in the circumferential direction of inner ring plate 80, a plurality of concentric support arms 81*b*, 82*b*, 83*b* extending from bases 81*a*, 82*a*, 83*a* and projections 81*c*, 82*c*, 83*c* of the arm edges that attach each of the support arms 81*b*, 82*b*, 83*b* to the inner wall surface of case 6.

Figure 6:
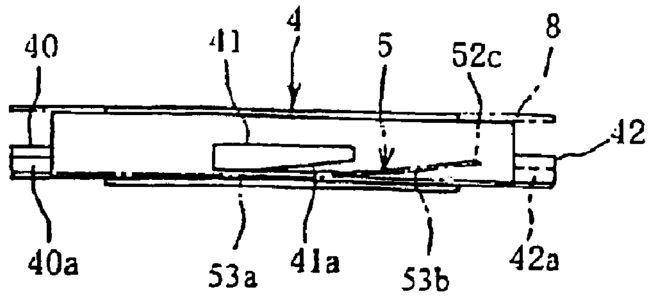
FIG. 6 is a side view showing the spatial relationship between the oscillation plate and the magnetic yoke comprising the vibrating actuator.

As shown in FIG. 6, this oscillation plate 8 is comprised by on the side separated by each flange 40, 41, 42 of the magnetic yoke 4 and consequently as shown in FIG. 5, even though each support arm 81*b*, 82*b*, 83*b* are brought positions corresponding to each flange 40, 41, 42 of the magnetic yoke 4, the oscillation plate 8 will avoid contact with the magnetic yoke 4. In this way each oscillation plate 5, 8 are slid into position by projections 51*c*, 52*c*, 53*c*, 81*c*, 82*c*, 83*c* on the end of the arm allowing each oscillation plate 5, 8 to be securely mounted to the surface of the inside of the wall of the case 6.

Case 6 is formed into a circular frame shape from resin such as polybutylene terephthalate (PBT). Step 60 that fits diaphragm 2 at peripheral edge 2*b* is installed in the frame edge of case 6. In addition, notched steps 61*a*, 62*a* that attach oscillation plates 5, 8 via projections 51*c*, 52*c*, 53*c*, 81*c*, 82*c*, 83*c* and depression 63*a* (only one is shown) that accepts the projection edges of flanges 40, 41, 42 while maintaining a gap as discussed below are installed on the inner surface from the frame edge.

Metal cover 9 that is engaged by peripheral edge 9*a* on the frame edge opposite from the frame edge engaging diaphragm 2 is fitted to case 6. Cover 9 is made of metal. It is engaged to the outer peripheral edge on the side opposite from the frame edge of case 6 that engages diaphragm 2. Vent holes 9*b* that modify the acoustic characteristics due primarily to high frequency are installed in the plate surface of this cover 9, as shown in FIG. 1.

The acoustic characteristics can be modified appropriately as required by altering the number of vent holes 9*b*, their positions in response to the number opened, and their bores. By so doing, a vibrating actuator can be constructed in which the acoustic characteristics are modified as required even at a given frequency band.

A unit without any vent holes opened in the cover (consult FIG. 11) was created as the standard to verify this. In addition, a unit with one vent hole (consult FIG. 12) in the cover, a unit with two vent holes (consult FIG. 13), a unit with three vent holes (consult FIG. 14), a unit with six vent holes (consult FIG. 15), and a unit with 12 vent holes (consult FIG. 16) were created. Changes in the wave form as a function of the frequency following the imposition of current to the coil under set conditions were then measured.

As indicated by the individual wave forms, the wave form can be altered as a function of the frequency even at a given frequency by opening vent holes in the cover as well as by modifying their number, position and bore. In particular, differing wave forms (consult FIG. 17) are exhibited at high frequency regions as a function of the vent-hole installation conditions. Utilizing this, different acoustic characteristics can be realized in the same device since different acoustic characteristics can be exhibited at a given frequency band.

Terminal block 10 is installed in case 6 protruding from the outer surface of the frame. Conduction terminals 10*a*, 10*b* can be firmly attached by wedging in terminal block 10.

Figure 7:
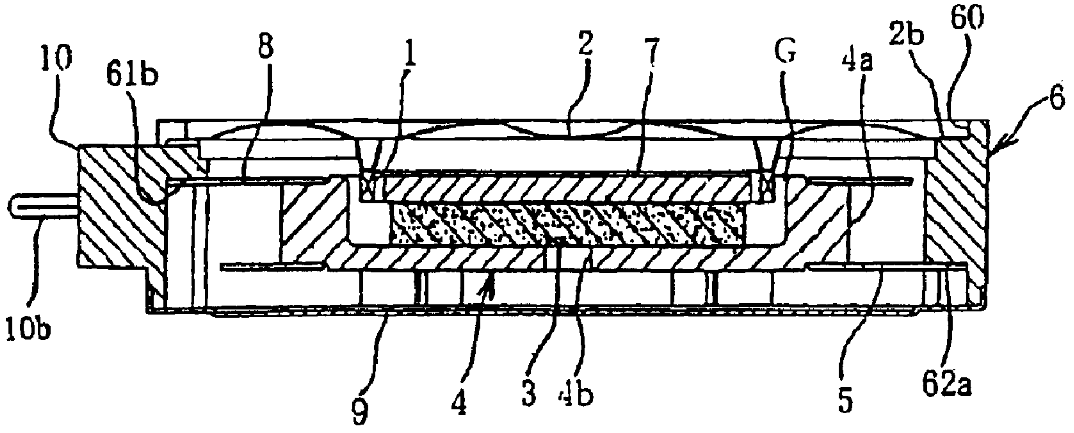
FIG. 7 is a sectional side elevation presenting the same magnetic yoke as in FIG. 2 but at a different angle.

In assembling the vibrating actuator comprising aforementioned units, diaphragm 2 is attached to the interior of the frame of case 6 engaging step 60 via peripheral edge 2*b* since coil 1 is attached to one side of diaphragm 2 in advance, as shown in FIG. 7. An electrical connection can be completed between coil 1 and conduction terminals 10*a*, 10*b* by soldering lead lines 1*a*, 1*b* that extend outward to conduction terminals 10*a*, 10*b* of terminal block 10.

In addition, magnet 3 is attached to magnetic yoke 4 and oscillation plate 8, and oscillation plate 5 can be attached within the frame of case 6 from the open edge on the other side in sequence by fastening magnetic yoke 4 holding magnet 3 to inner ring plate 50 of oscillation plate 5.

Figure 8:
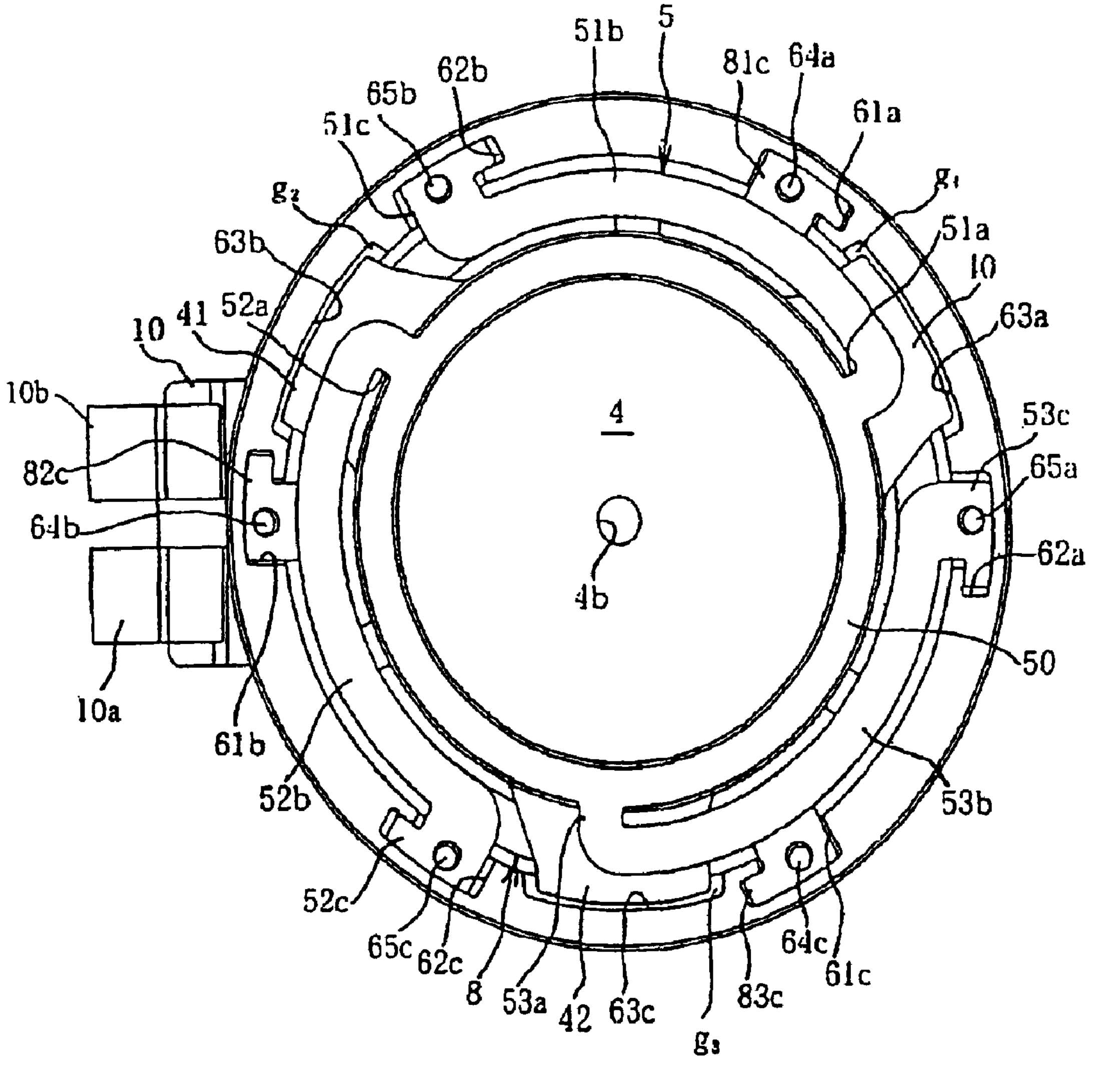
FIG. 8 is a base view showing the same vibrating actuator with the cover removed.

As shown in FIG. 8, oscillation plate 8 has projections 81*c*, 82*c*, 83*c* of the arm edge that are attached by crimping via projection pins 64*a*, 64*b*, 64*c* that fit in the vent holes opened in projections 81*c*, 82*c*, 83*c* and that are fastened to notched steps 61*a*, 61*b*, 61*c* formed in the frame of case 6. Similarly, oscillation plate 5 that holds magnetic yoke 4 has projections 51*c*, 52*c*, 53*c* of the arm tip that are fastened to notched steps 62*a*, 62*b*, 62*c* installed in the frame of case 6, and that are crimped by projection pins 65*a*, 65*b*, 65*c* that fit in the vent holes opened in projections 51*c*, 52*c*, 53*c*.

By so doing, coil 1 is supported and fastened by diaphragm 2. It is attached between outer peripheral edge 4*a* of magnetic yoke 4 and ball piece 7 while maintaining magnetic gap G. Magnetic yoke 4 is supported by oscillation plate 5 and the tip sides of flanges 40, 41, 42 are accepted on the inside of depressions 63*a*, 63*b*, 63*c* while maintaining gaps g1 to g3.

Depressions 63*a*, 63*b*, 63*c* function as stoppers that inhibit lateral play of magnetic yoke 4. In addition, they function as recesses that minimize the diametral width of case 6. Cover 9 may be engaged and attached to the open side of case 6 after attaching each oscillation plate 5 and 8.

The vibrating actuator can be attached to an external case of the unit by fastening case 6 to the surface of a circuit board (not illustrated) between elastic bodies such as rubber. Furthermore, a circuit connection with dependent devices can be completed by inserting conduction terminals 10*a*, 10*b* into the board surface of the circuit board. An electrical connection between coil 1 and dependent devices can be reliably completed since conduction terminals 10*a*, 10*b* are firmly attached by wedging in terminal block 10.

The vibrating actuator having such a structure can be attached to a portable electronic device such as a pager or telephone as a notification means to notify of a call upon signal arrival via a buzzer, speech or vibration through vibration of oscillation plates 5, 8 and of diaphragm 2 via attraction/repulsion of magnetism of coil 1 and magnetism of magnet 3 when high frequency current or low frequency current is applied to coil 1.

Figure 9:
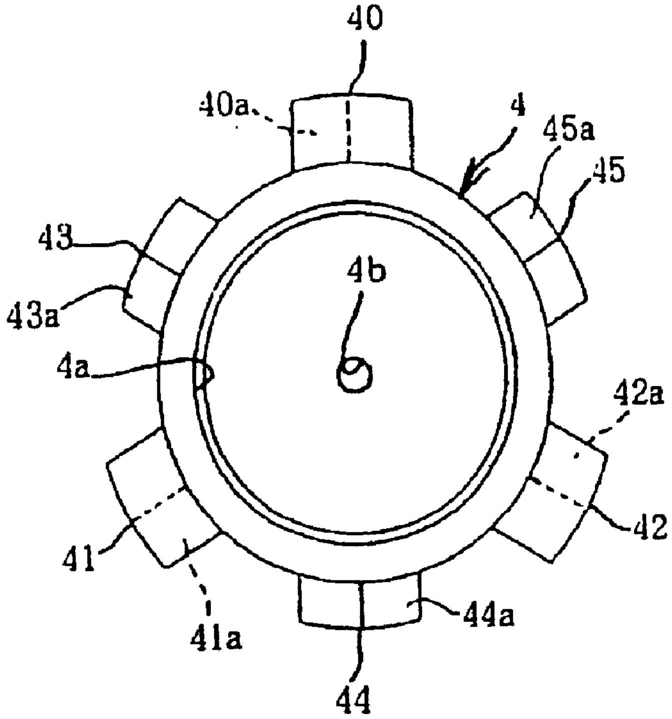
FIG. 9 is a planar figure showing another magnetic yoke in the same vibrating actuator.

Aforementioned mode of implementation was explained based on magnetic yoke 4 having three flanges 40, 41, 42, but magnetic yoke 4 having six flanges 40–45 at uniform separations in the circumferential direction of magnetic yoke 4 may be attached, as shown in FIG. 9.

Figure 10:
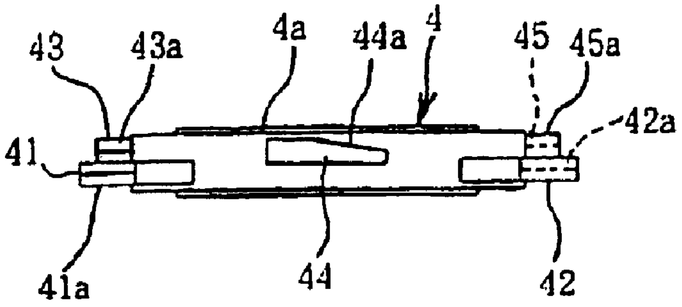
FIG. 10 is a side view showing the magnetic yoke of FIG. 9.
Figure 11:
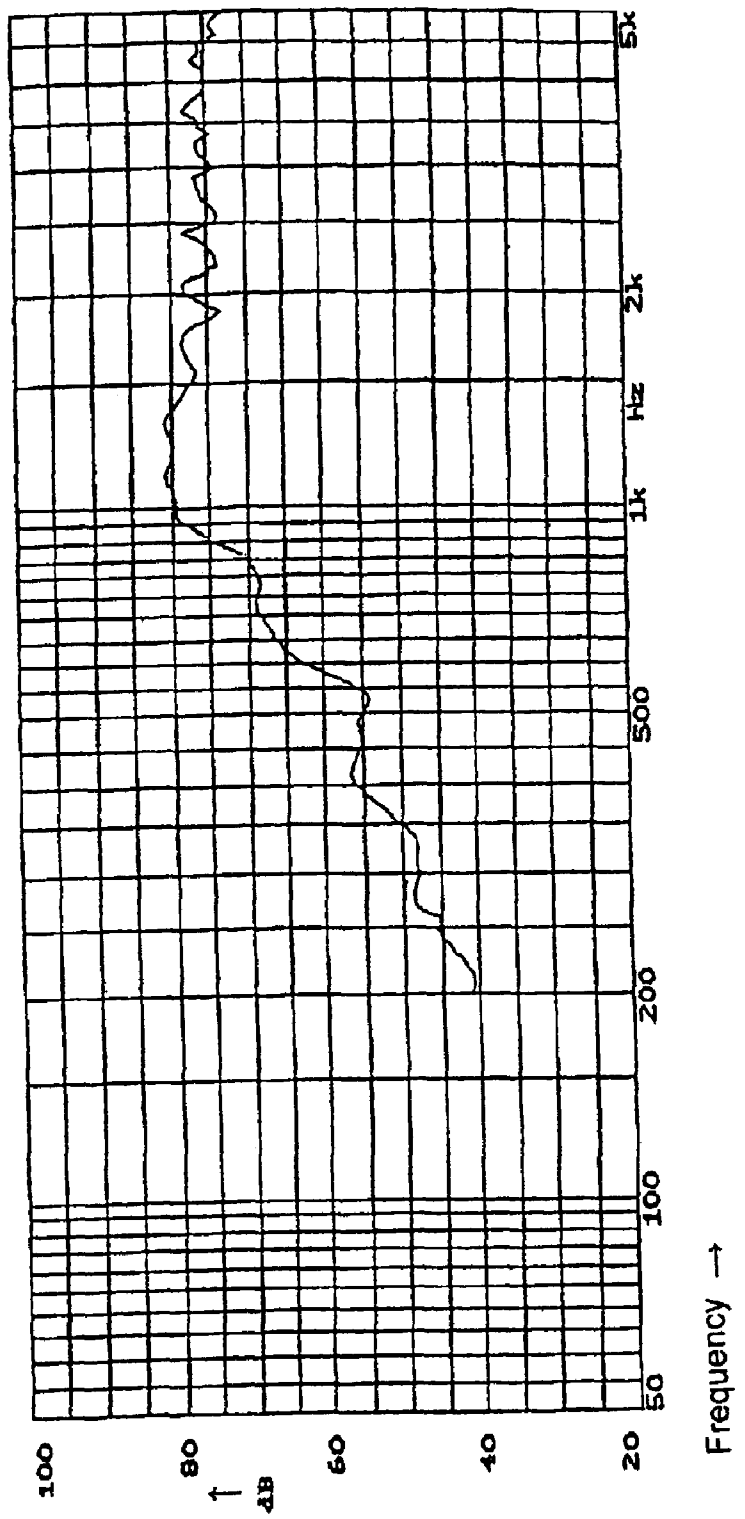
FIG. 11 is a graph showing the frequency wave form due to the same vibrating actuator with a cover lacking vent holes.
Figure 12:
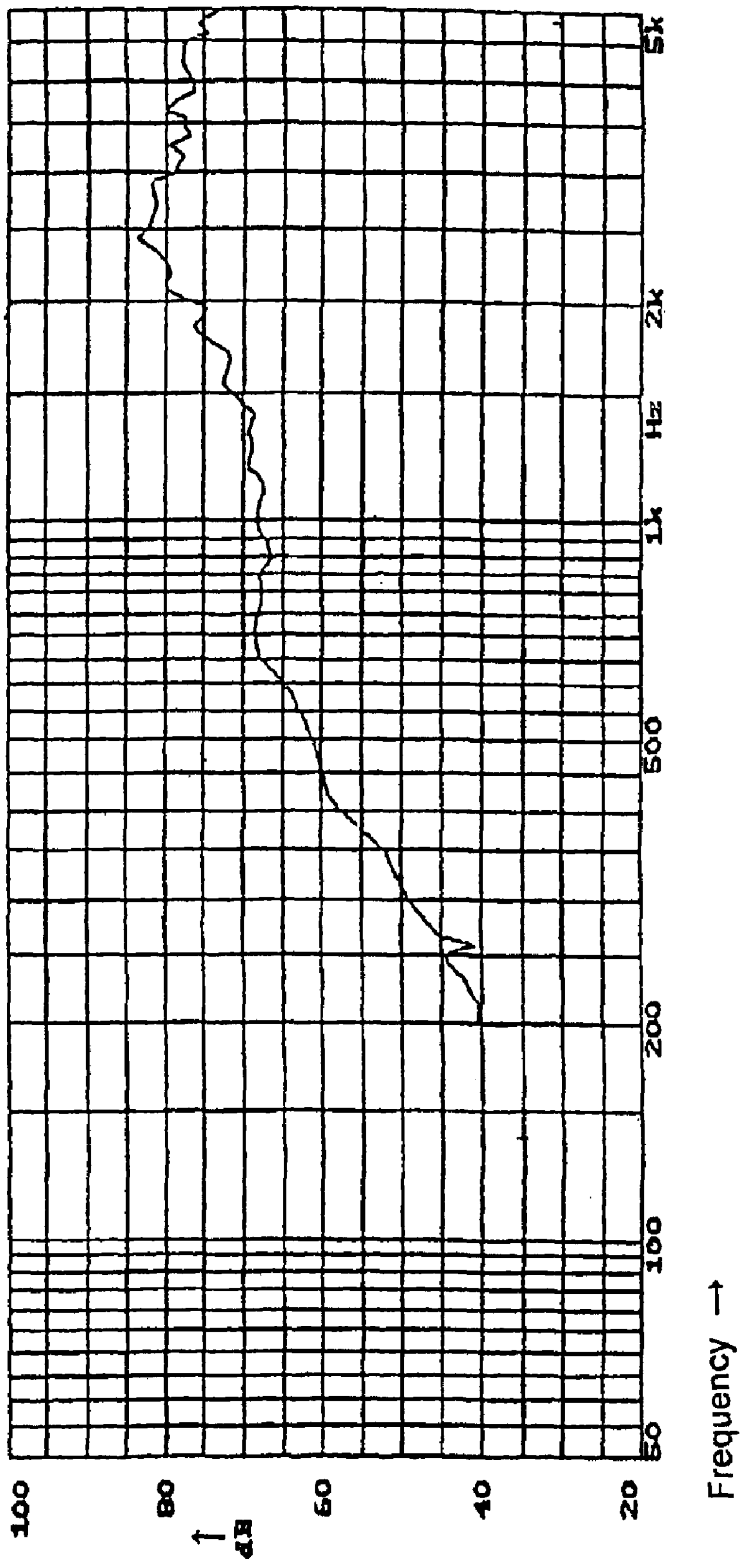
FIG. 12 is a graph showing the frequency wave form due to the same vibrating actuator with a cover that has one vent hole.
Figure 13:
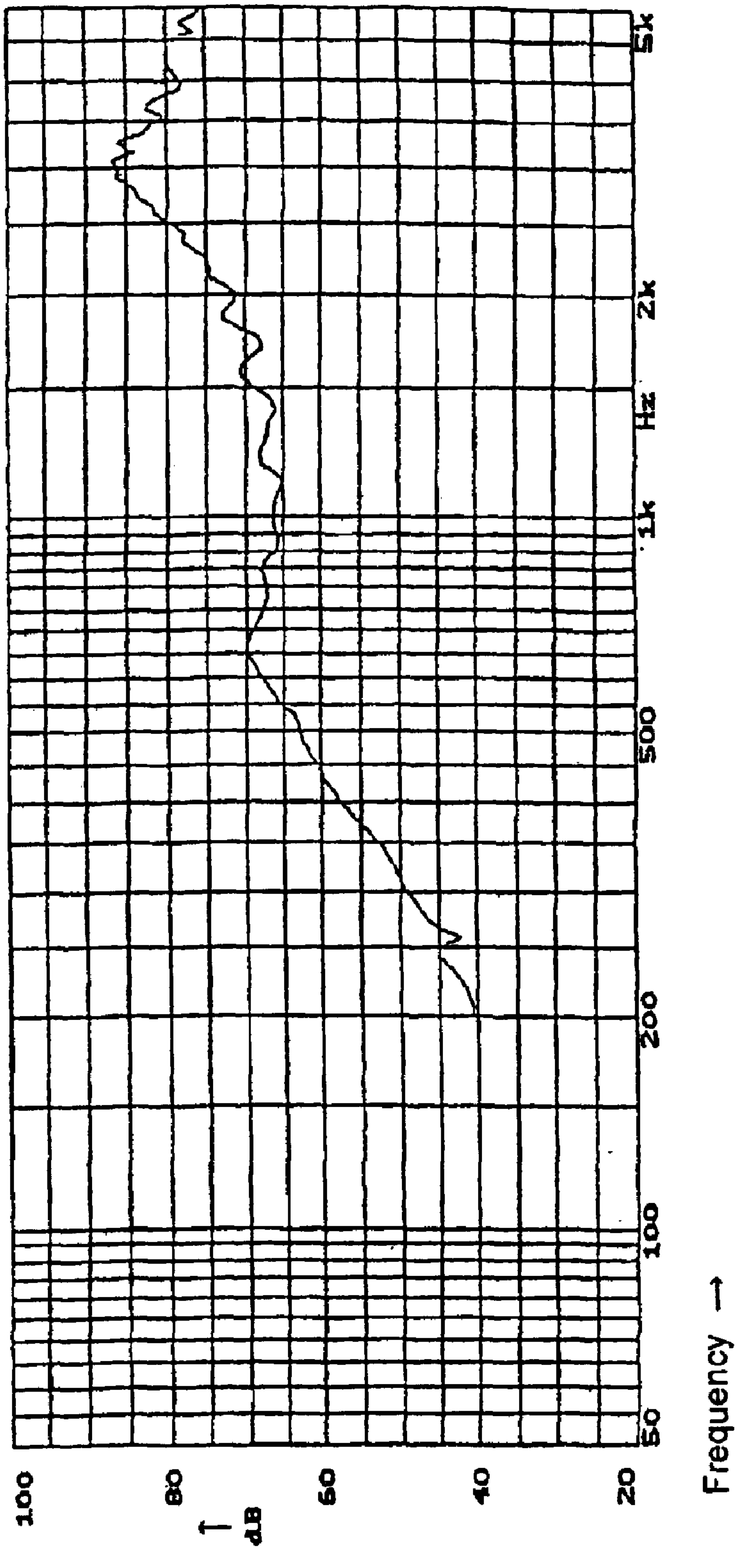
FIG. 13 is a graph showing the frequency wave form due to the same vibrating actuator with a cover that has two vent holes.
Figure 14:
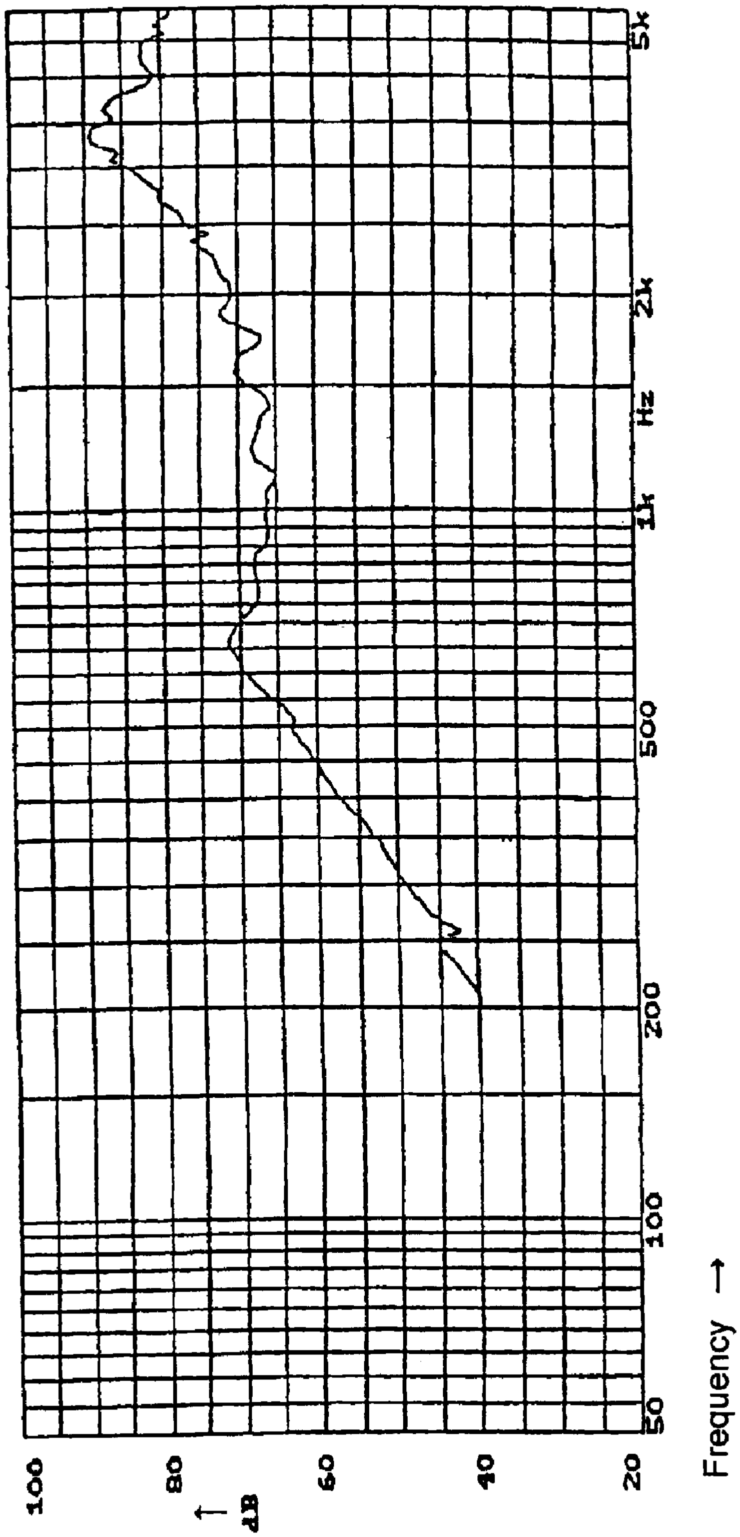
FIG. 14 is a graph showing the frequency wave form due to the same vibrating actuator with a cover that has three vent holes.
Figure 15:
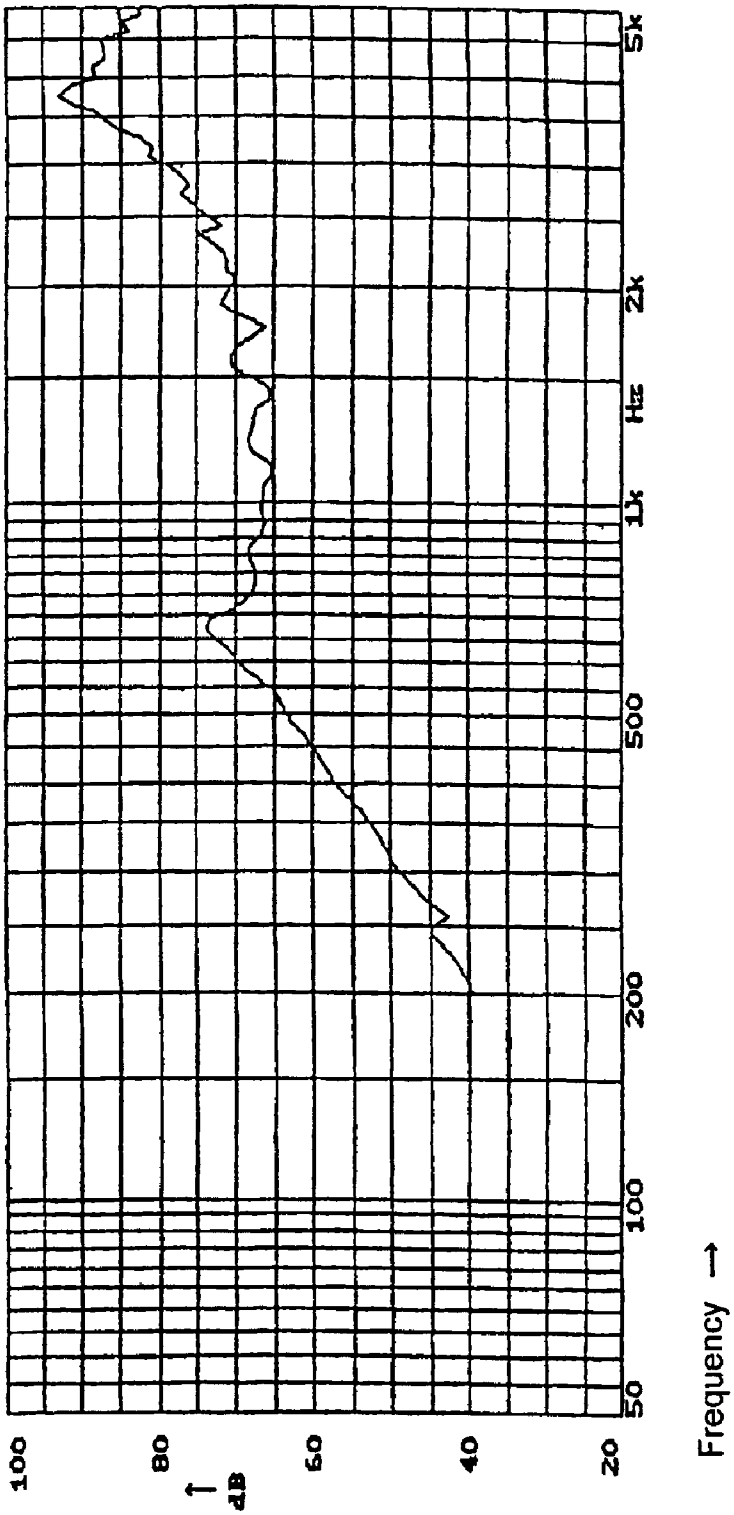
FIG. 15 is a graph showing the frequency wave form due to the same vibrating actuator with a cover that has six vent holes.
Figure 16:
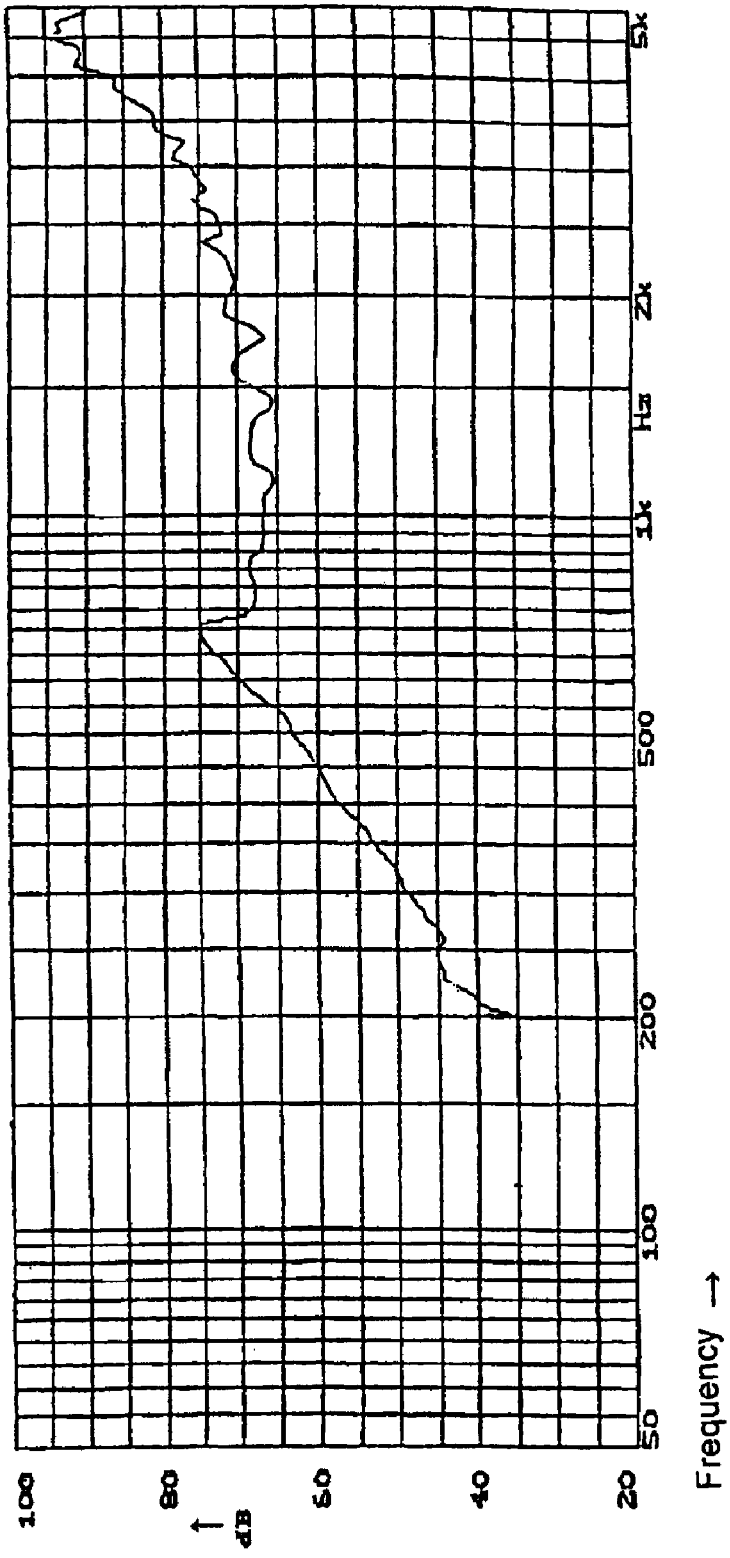
FIG. 16 is a graph showing the frequency wave form due to the same vibrating actuator with a cover that has 12 vent holes.
Figure 17:
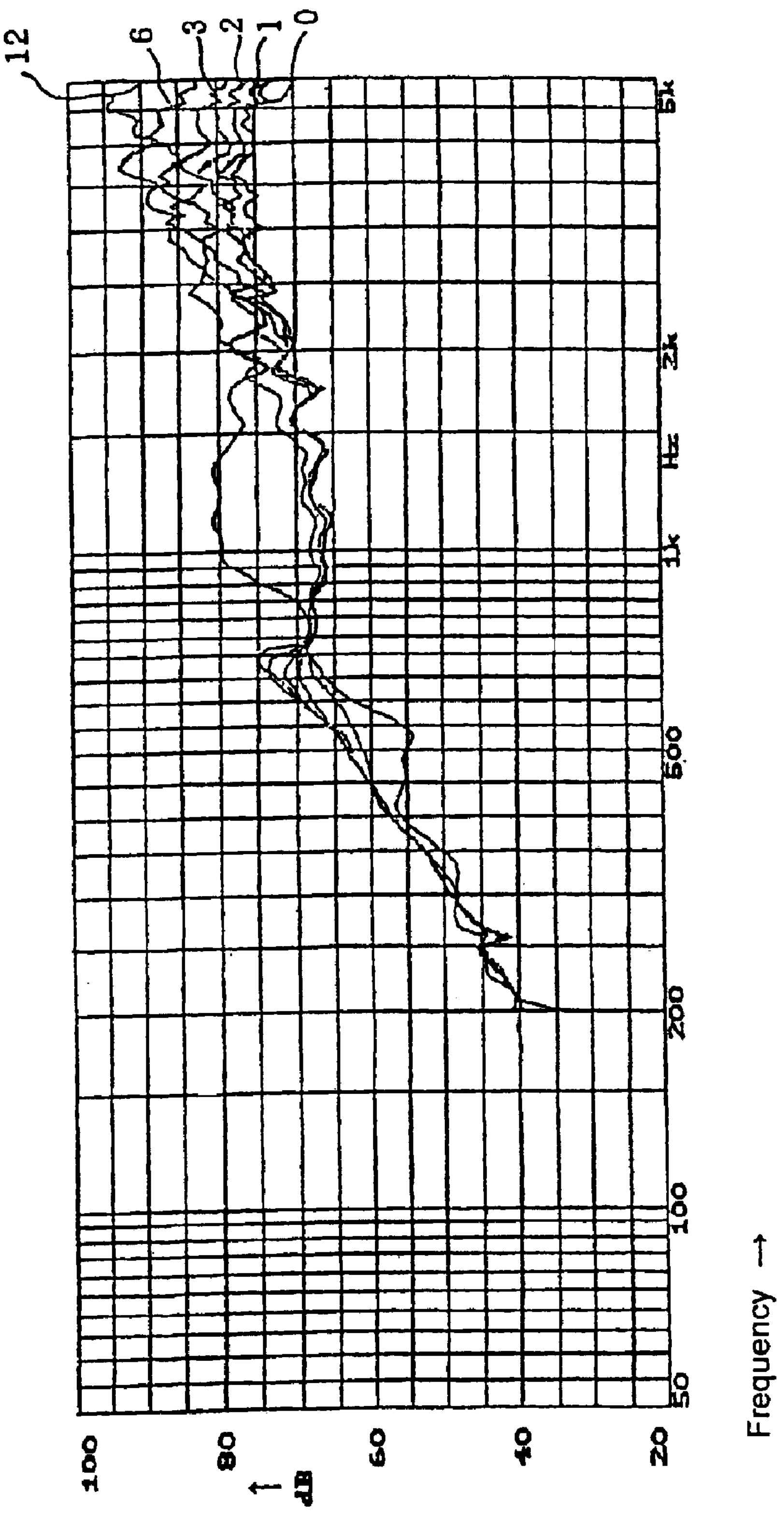
FIG. 17 is a graph summarizing the frequency wave forms of the vibrating actuators shown in FIGS. 11 to 16.

In magnetic yoke 4, as shown in FIG. 10, each of flanges 40–45 may be attached with their positions mutually shifted so as to approach bases 51*a*, 52*a*, 53*a*, 81*a*, 82*a*, 83*a* of support arms 51*b*, 52*b*, 53*b*, 81*b*, 82*b*, 83*b* in each of oscillation plates 5, 8. Furthermore, on the attachment side of oscillation plate 8, the slanted surfaces of each of flanges 43, 44, 45 may be formed so that their thickness decreases from roughly the center in the projection direction toward the ends 43*a*, 44*a*, 45*a*.

In addition, aforementioned mode of implementation was explained based on altering the high frequency region whose wave forms vary greatly through opening vent holes, but it can also be applied to altering the vibration characteristics of a low frequency region which changes slightly.

The installation of vent holes 9*b* in cover 9 not only affect the acoustic characteristics but they also prevent popping of a vibrator comprising two oscillation plates 5, 8 including magnetic yoke 4 from the case due to pressure accompanying a fall.

(Embodiment 2)

Figure 18:
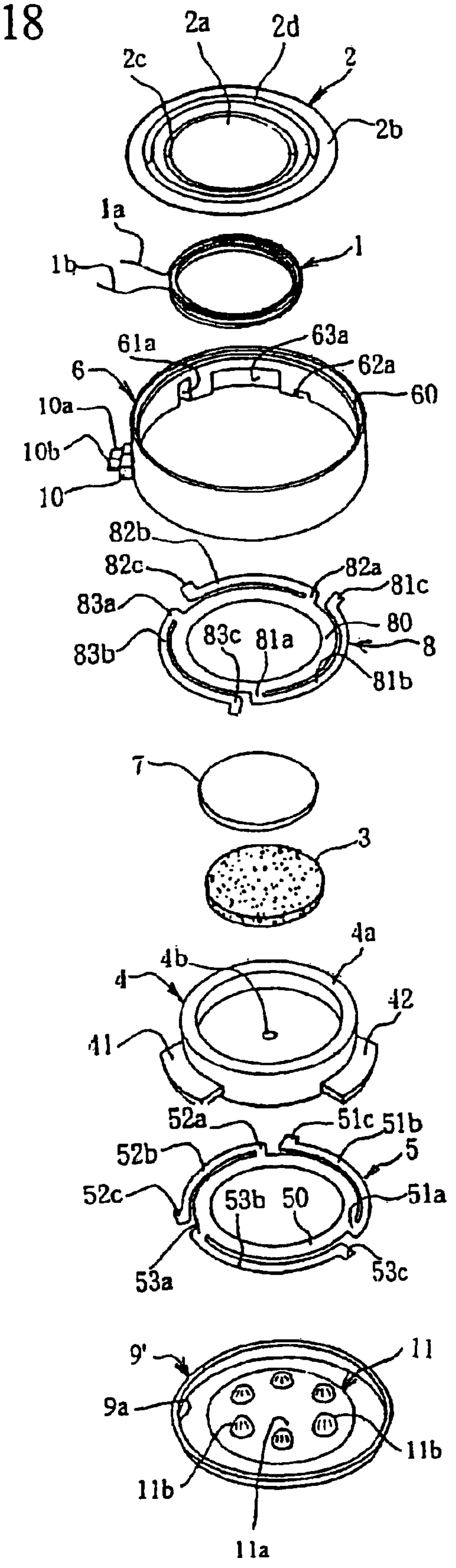
FIG. 18 is an expanded perspective diagram showing each part comprising the vibrating actuator pursuant to Embodiment 2 of the present invention.
Figure 19:
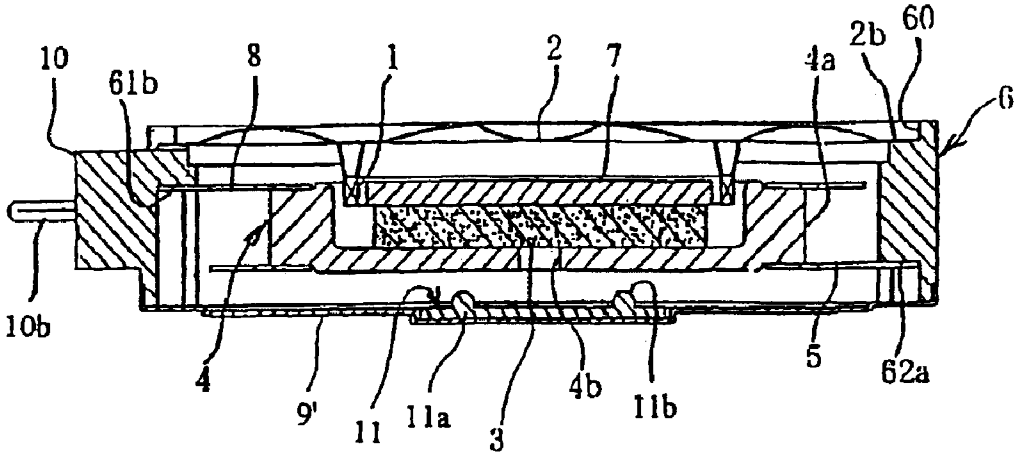
FIG. 19 is a sectional side elevation showing the assembly of the vibrating actuator in FIG. 18.
Figure 20:
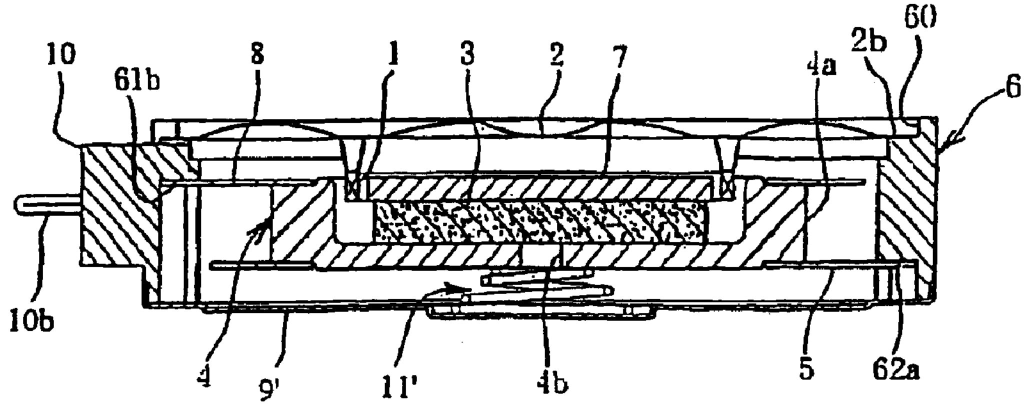
FIG. 20 is a sectional side elevation showing a vibrating actuator provided with a different damper pursuant to the present invention.

The second embodiment is explained through FIGS. 18, 19 and 20. Those structures that are identical with the structures in Embodiment 1 are given the same number and an explanation of them is omitted. Damper material 11 for controlling vibration that is placed between oscillation plate 5 and cover 9' as shown in FIG. 19 is attached by bonding onto the lower inner surface in the vibrating actuator shown in FIG. 18.

Rubber or spongy elastic plate comprising disc-shaped body plate 11*a* of prescribed thickness and a plurality of projections 11*b* rising from body plate 11*a* toward oscillation plate 5 that is attached complete damper material 11. The body plate 11*a* of the elastic plate 11 is installed and fixed on depression of the inner bottom surface of cover 9'.

A vibrating actuator with such a structure can be attached to a portable electronic device such as a pager or portable telephone by bringing the attachment side of cover 9' close to the case walls of the device and attaching it to the inside of said case.

Even if impact is applied to the case of the device in such a portable electronic device, the effects of the impact are prevented from reaching oscillation plate 5 since the impact can be absorbed by damper material 11 comprising the rubber or spongy elastic plate attached to cover 9'. Furthermore, even if oscillation plate 5 should be flexed by impact, deformation of oscillation plate 5 would be prevented since it contacts projection 11*b* of elastic plate 11. Thus, the generation of noise due to abnormal vibration of oscillation plate 5 can be prevented.

Coil spring 11' may be attached instead of rubber or spongy elastic plate 11 as the damper material, as shown in FIG. 20. Coil spring 11' is constructed so as to support oscillation plate 5 from below by fitting the lower spring spiral to the concavity at the inner bottom surface of cover 9' and then bringing oscillation plate 5 into contact with cover 9'.

Impact applied to the case of the device can be absorbed by coil spring 11'. Consequently, the effects of impact can be prevented from reaching oscillation plate 5 and significant flexing of oscillation plate 5 can also be prevented.

A spiral spring having a diameter that decreases from cover 9' toward oscillation plate 5 may be attached as coil spring 11'. By so doing, impact applied to the case of the device can be absorbed on the large-diameter spiral side and can be reliably prevented from reaching oscillation plate 5 while deformation of oscillation plate 5 can be reliably prevented since oscillation plate 5 can be stably supported on the small-diameter spiral side.

(Embodiment 3)

The third embodiment of the present invention is explained using FIGS. 5, 11–17 and 21–24. Those structures that are identical with the structures in Embodiments 1 and 2 are given the same number and an explanation of them is omitted.

Figure 21:
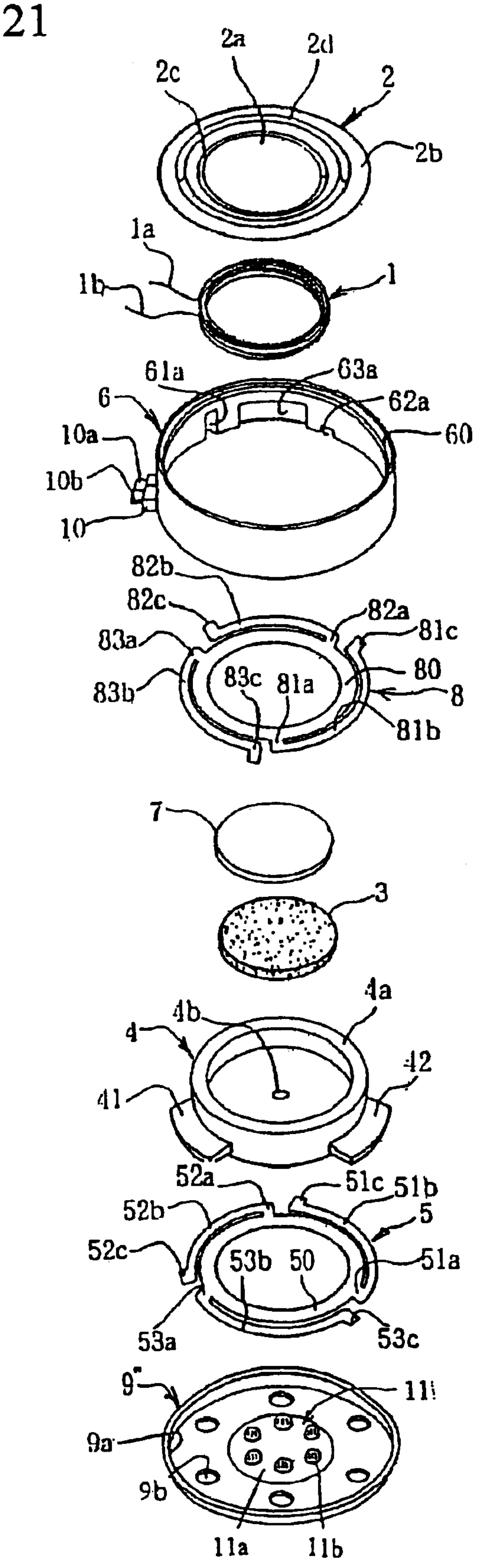
FIG. 21 is an expanded perspective diagram showing each part comprising the vibrating actuator pursuant to Embodiment 3 of the present invention.
Figure 22:
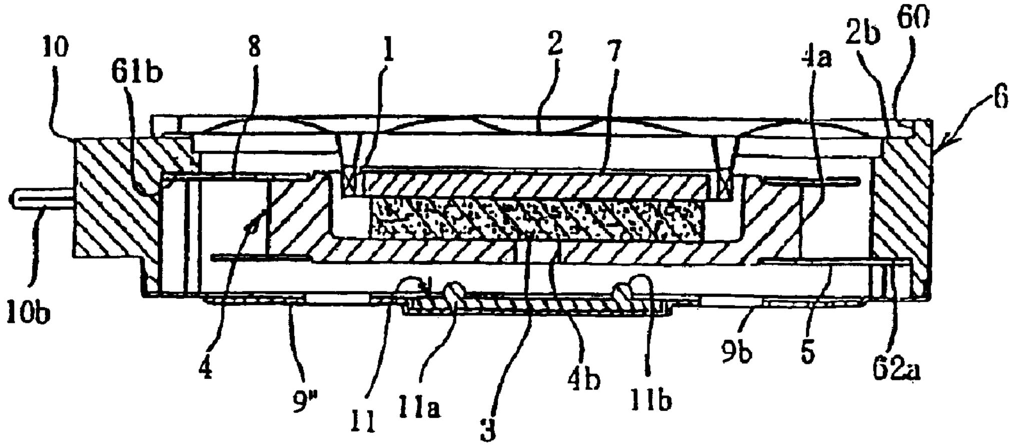
FIG. 22 is a sectional side elevation showing the assembly of the vibrating actuator in FIG. 21.

Damper material 11 for controlling vibration that is placed between cover 9" and oscillation plate 5, as shown in FIG. 22, lines the inner bottom surface in the vibrating actuator shown in FIG. 21. Vent holes 9*b* for modifying the acoustic characteristics due to high frequencies are opened on the outside of damper material 11.

A unit without any vent holes opened in cover 9" (consult FIG. 11) was created as the standard to verify this. In addition, just as in Embodiment 1, a unit with one vent hole (consult FIG. 12) in the cover of the same bore and position, a unit with two vent holes (consult FIG. 13), a unit with three vent holes (consult FIG. 14), a unit with six vent holes (consult FIG. 15), and a unit with 12 vent holes (consult FIG. 16) in cover 9" were created. Changes in the wave form as a function of the frequency following the imposition of current to the coil under set conditions were then measured.

The same acoustic characteristics as in Embodiment 1 were exhibited as a result, as shown by each wave form in FIGS. 11 to 16. Therefore, the wave form could be modified as a function of the frequency even at a given frequency band, as indicated by the individual wave forms, without modifying the number, position or bore of the vent holes and by mounting damper material so as not to block the vent holes. In particular, different wave forms could be exhibited in high frequency bands as a function of the vent-hole mounting conditions (consult FIG. 17). Utilizing this, the acoustic characteristics could be modified in a given device, thereby expanding the utility, since different acoustic characteristics could be exhibited at a given frequency band.

Figure 23:
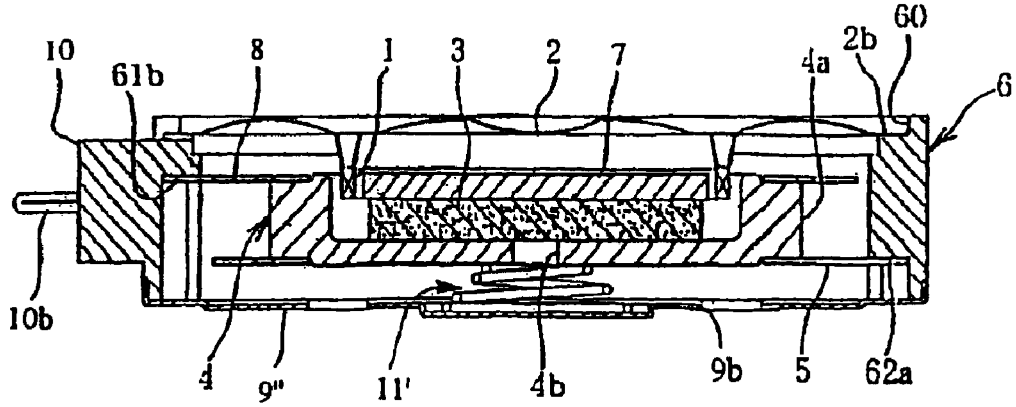
FIG. 23 is a sectional side elevation showing a vibrating actuator provided with a different damper and vent holes outside of said damper.
Figure 24:
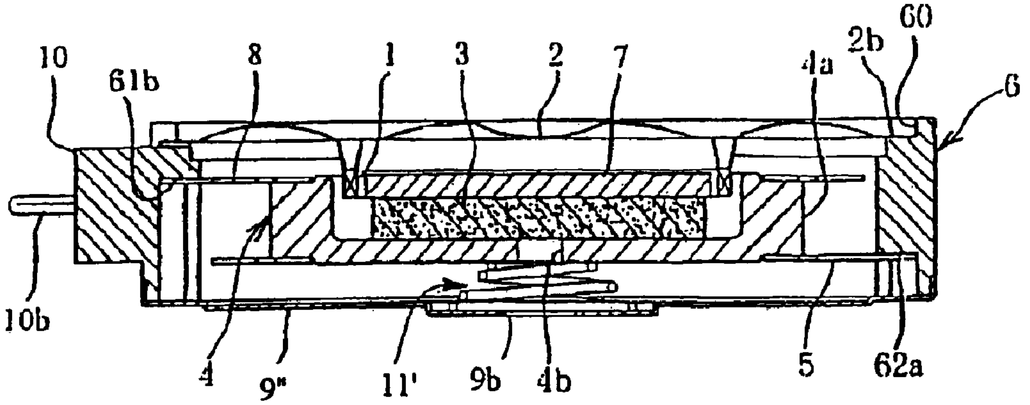
FIG. 24 is a sectional side elevation showing a vibrating actuator provided with vent holes on the inside of the minor diameter of the damper shown in FIG. 23.

Furthermore, a coil spring could be used as damper material without modifying the number, position or bore of the vent holes and by mounting the springs so as not to block the vent holes. That would permit the same acoustic characteristics as those of Embodiment 1 to be attained. The position of vent holes 9*b* when using coil springs would be outside of coil spring 11' as shown in FIG. 23, inside the inner diameter of coil spring 11' as shown in FIG. 24, or prescribed numbers may be opened outside of and inside of the inner diameter of coil spring 11', combining FIG. 23 with FIG. 24.

The installation of vent holes 9*b* can be applied to modifying the vibration characteristics in the low frequency band that changes slightly, just as in Embodiment 1.

The installation of vent holes 9*b* in cover 9" not only affect the acoustic characteristics but they also prevent popping of a vibrator comprising two oscillation plates 5, 8 including magnetic yoke 4 from the case due to pressure accompanying a fall.

In addition to aforementioned vent holes in this embodiment, the generation of noise and deformation due to abnormal vibration of oscillation plate 5 can be prevented by installing damper material between oscillation plate 5 and cover 9".

Furthermore, as shown in FIG. 21, this embodiment has flanges 40–42 as well as depression 63*a* mounted with oscillation plates 5, 8 fastened to magnetic yoke 4, as shown in FIG. 5, thereby providing the same effects as those in Embodiment 1.

Consequently, this embodiment provides a broader range of utility of vibrating actuators compared to Embodiment 1 and Embodiment 2.

(Embodiment 4)

The power supply mechanism of the vibrating actuator in Embodiment 4 of the present invention is explained through FIGS. 25 to 32. Those structures that are identical with the structures in Embodiments 1 to 3 are given the same number and an explanation of them is omitted.

Figure 25:
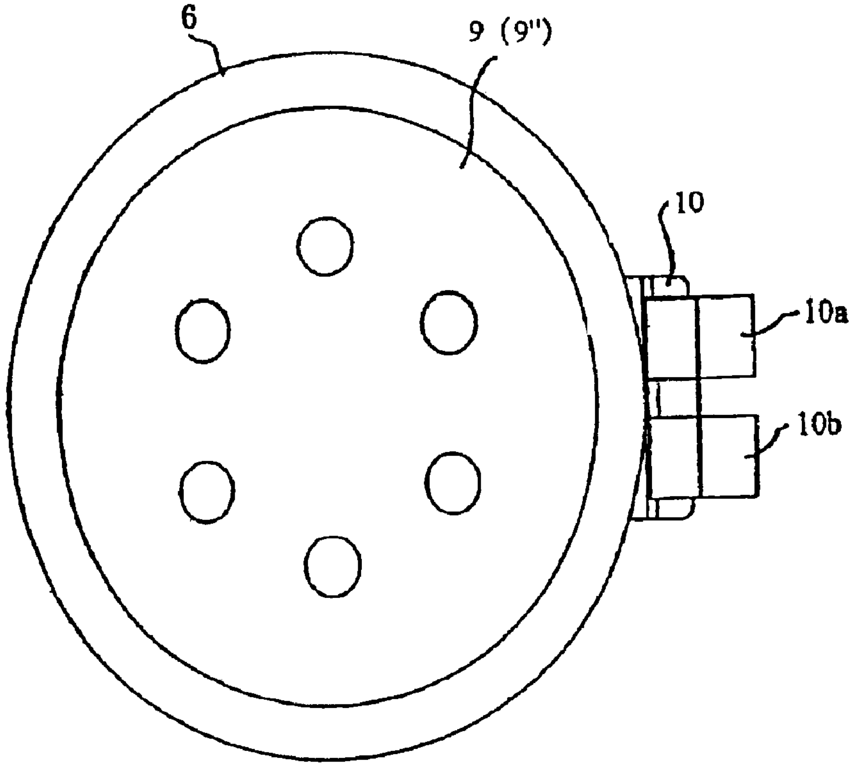
FIG. 25 is a planar figure showing the vibrating actuators of Embodiment 1 and Embodiment 3.
Figure 26:
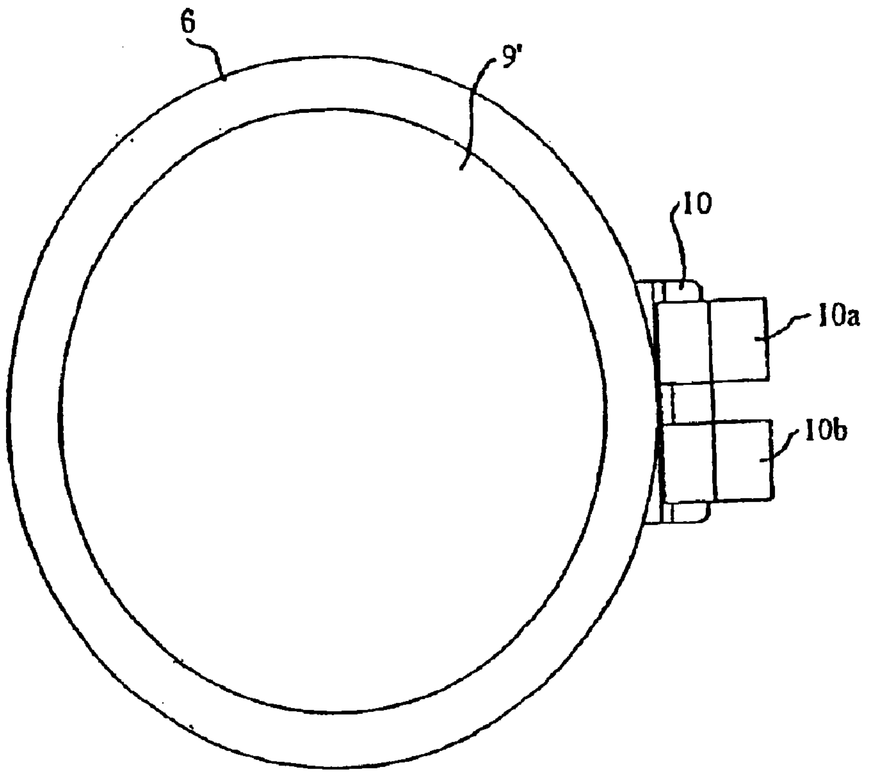
FIG. 26 is a planar figure showing the vibrating actuator of Embodiment 2.

Conduction terminals 10*a*, 10*b* projecting outside from case 6 are installed as positive and negative terminals in the vibrating actuator of Embodiments 1 and 3, as shown in FIG. 25, or in the vibrating actuator of Embodiment 2, as shown in FIG. 26 (hereinafter abbreviated vibrating actuator A). Conduction terminals 10*a*, 10*b* formed from metal plate having good conductivity are bent. They can be electrically connected to the coil tip of coil 1 by including terminal block 10 of insulating resin outside of case 6.

Vibrating actuator A is mounted inside of the case (not illustrated) in various types of devices such as pagers or portable telephones, and is mounted on circuit board P, as shown in FIGS. 27 to 32. Furthermore, power supply 12 of the device may be installed separately for positive and negative terminals by a land of the conducting pattern in circuit board P.

The power-supply terminal that electrically conducts to power supply 12 of circuit board P may be individually mounted by mutually insulating the positive and negative terminals. Such power supply terminals individually contact conduction terminals 10*a*, 10*b* of vibrating actuator A, and are structured from conducting spring units that provide elasticity with vibration of vibrating actuator A.

The spring units comprising the power-supply terminals for positive and negative are shown on one side, but a common structure of positive and negative terminals through their mutual insulation may be installed. This specific example includes both types in which power supply 12 rises over circuit board P, shown in FIGS. 27 to 31, and the type shown in FIG. 32 in which it is clenched in vibrating actuator A.

Figure 27:
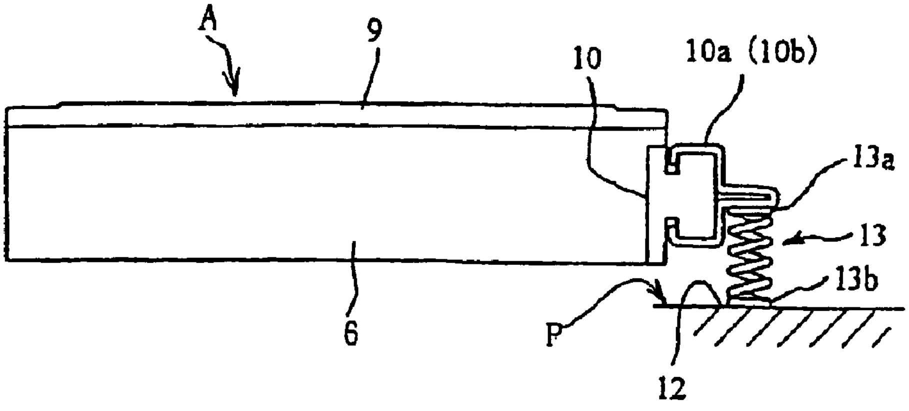
FIG. 27 is a side view showing the vibrating actuator pursuant to the present invention provided with an example of a power supply mechanism.

The power-supply terminals shown in FIG. 27 is composed of coil spring 13 comprising side spring terminal 13*a* rising from power supply 12 on circuit board P that contacts conduction terminal 10*a* (10*b*) of vibrating actuator A. Opposite spring terminal 13*b* of coil spring 13 is soldered to power supply 12, and electrically connected by soldering, welding, etc., to risen formation on circuit board P.

Figure 28:
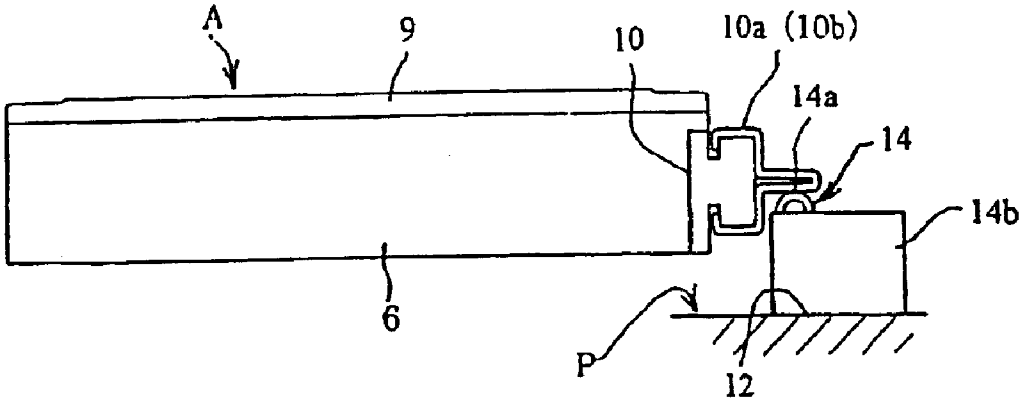
FIG. 28 is a side view showing a vibrating actuator pursuant to the present invention provided with another power supply mechanism.

The power-supply terminal shown in FIG. 28 comprises arc-shaped leaf spring 14 in which apex 14*a* contacts conduction terminal 10*a* (10*b*) of vibrating actuator A. Each spring terminal of leaf spring 14 is embedded in and supported by insulating resin terminal base 14*b* on the planar surface of circuit board P, and is electrically connected to power supply 12 of circuit board P via terminal base 14*b*.

Figure 29:
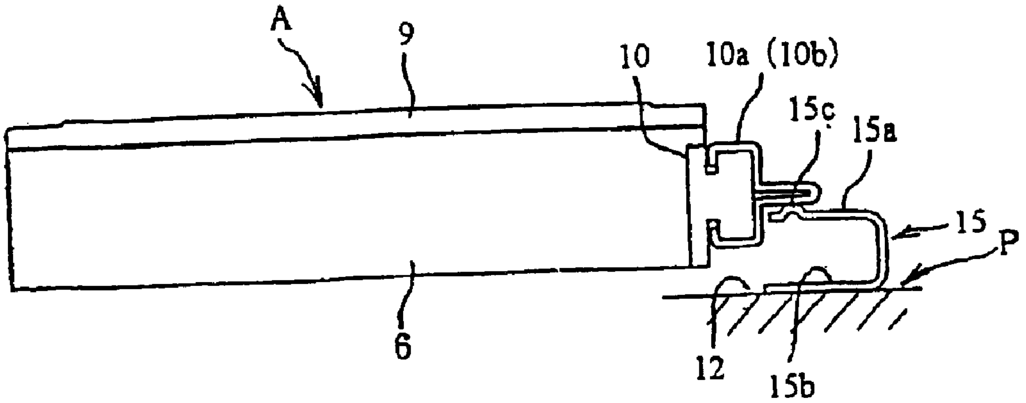
FIG. 29 is a side view showing a vibrating actuator pursuant to the present invention provided with another power supply mechanism.

The power-supply terminal shown in FIG. 29 comprises U-shaped leaf spring 15 in which side spring terminal 15*a* contacts conduction terminal 10*a* (10*b*) of vibrating actuator A. Opposite spring terminal 15*b* of leaf spring 15 is fixed to power supply 12 of circuit board P by soldering, welding, etc., and it can rise from the planar surface of circuit board P. Contact point 15*c* that contacts conduction terminal 10*a* (10*b*) by bending the planar surface into bead form may be installed in leaf spring 15.

Figure 30:
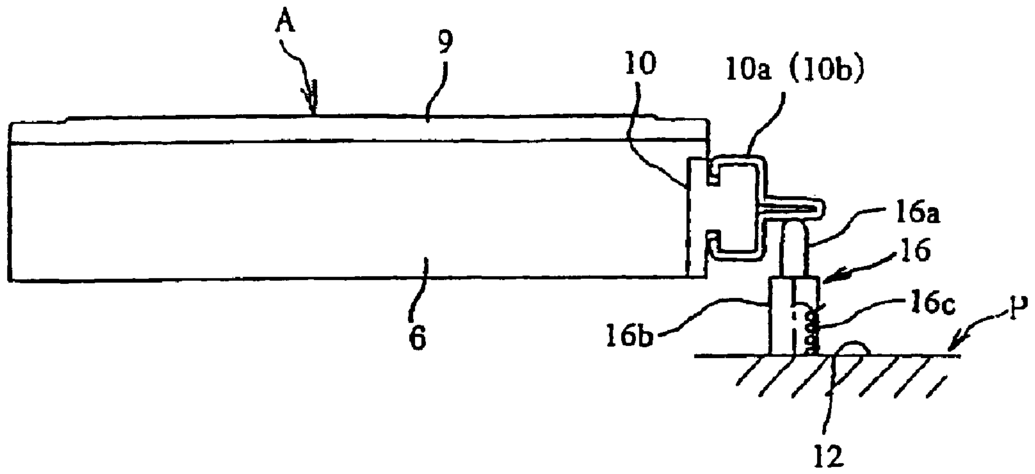
FIG. 30 is a side view showing a vibrating actuator pursuant to the present invention provided with another power supply mechanism.

The power-supply terminals shown in FIG. 30 may be structured from elastic projection 16 in which tip 16*a* contacts conduction terminal 10*a* (10*b*) of vibrating actuator A. Projection 16 can be supported by holder 16*b* rising from power supply 12 of circuit board P and it can be raised to the planar surface of circuit board P by support so as to elastically and freely move via coil spring 16*c* housed within holder 16*b*.

Figure 31:
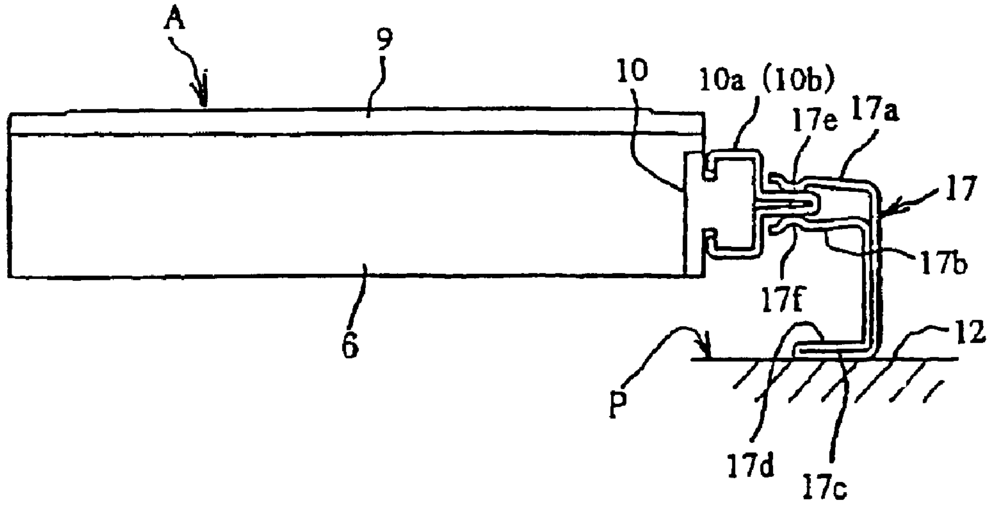
FIG. 31 is a side view showing a vibrating actuator pursuant to the present invention provided with another power supply mechanism.

The power-supply terminal shown in FIG. 31 is composed of double U shaped leaf spring 17 so that spring tip 17*a*, 17*b* hold conduction terminal 10*a* (10*b*) of vibrating actuator A. Each U shape of leaf spring 17 can be overlaid and continuously bent at bases 17*c*, 17*d*, and bases 17*c* and 117*d* can be provided to power supply 12 of circuit board P and then affixed by soldering, welding, etc., to permit rise to the planar surface of circuit board P. This leaf spring 17 may also have contact points 17*e*, 17*f* that contact conduction terminal 10*a* (10*b*) after bending the planar surface into bead shape.

Figure 32:
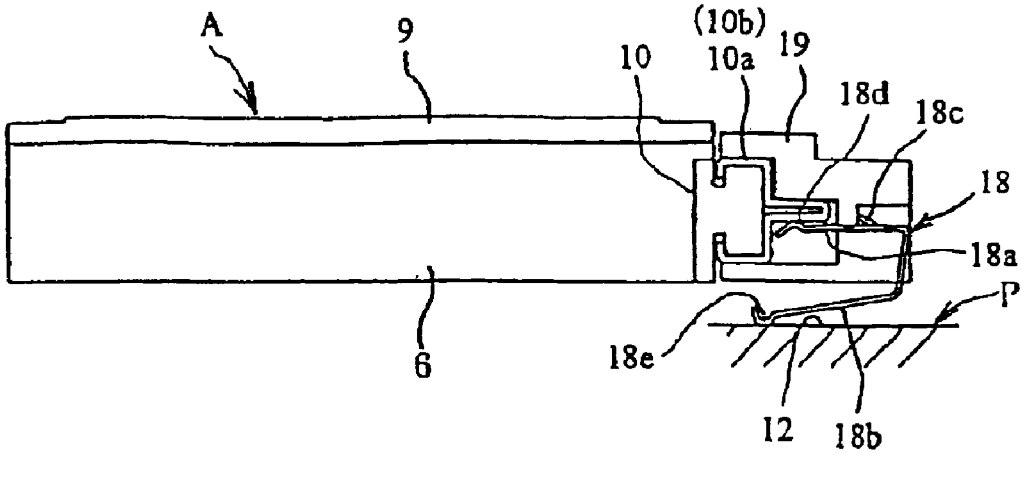
FIG. 32 is a side view showing a vibrating actuator pursuant to the present invention provided with another power supply mechanism.

In the power-supply terminals shown in FIG. 32, side spring terminal 18*a* extending horizontally contacts conduction terminal 10*a* (10*b*) of vibrating actuator A, and opposite spring terminal 18*b* extending at an angle contacts power supply 12 of circuit board P to complete a roughly U shaped leaf spring 18. By clenching terminal block 10 that contains conduction terminals 10*a*, 10*b*, leaf spring 18 can be held by insulating resin holder 19 that engages the side of case 6. Projection piece 18*c* in leaf spring 18 is bent to regulate the insertion position relative to insulating resin holder 19, and contact point 18*d* that contacts conduction terminal 10*a* (10*b*) as well as contact point 18*e* that contacts power supply 12 may be installed by bending the planar surface into bead shape.

The power-supply terminals in the power-supply mechanism of the vibrating actuator having this structure comprise flexible conducting springs 13–18 that match vibration of vibrating actuator A. Springs 13–18 eliminate the problem of disconnection via a simple structure. Conduction terminals 10*a*, 10*b* can follow conduction terminals 10*a*, 10*b* accompanying vibration of vibrating actuator A by maintaining elasticity even with slight vertical movement, and electrical conduction can be reliably maintained with conduction terminals 10*a*, 10*b* since contact can be maintained with power supply 12 of circuit board P.

Aforementioned power-supply mechanism was explained as a vibrating actuator, but it can be applied broadly in various types of actuators that vibrate during operation.

The terms and expressions used in the specifications were merely used to explain the present invention. They in no way restrict the details of the present invention. Even if restrictive terms or expressions are used, they have not been used to homogenize aforementioned modes of the present invention or to exclude certain parts. Accordingly, various modifications within the scope of the present invention for which rights are sought are clearly permissible.

FIELD OF INDUSTRIAL UTILIZATION

As explained above, the vibrating actuator pursuant to the present invention is useful as a means of notification attached to a portable electronic device such as a pager or portable telephone. In addition, the power-supply mechanism is suited for reliable electrical conduction.

What is claimed is:

1. A power supply mechanism of a vibrating actuator having electrical connection terminals that project outward from the side of the case installed on the actuator side, wherein conducting springs that contact the electrical connection terminals on the actuator side and that can maintain contact accompanying vibration on said actuator side are installed as electrically conducting power-supply terminals with the power-supply section of the circuit board; and wherein the power-supply section and the conducting springs are electrically connected by soldering or welding.-

2. The vibrating actuator and the power supply mechanism of the vibrating actuator of claim 1 in which coil springs whose spring tips contact the electrical connection terminals on the actuator side are installed as power-supply terminals that rise from the power-supply section of the circuit board.

3. The power supply mechanism of a vibrating actuator of claim 1 in which arc-shaped leaf springs whose apex contacts the electrical connection terminal on the actuator side are installed as power-supply terminals that rise from the power-supply section of the circuit board.

4. The power supply mechanism of a vibrating actuator of claim 1 in which a U shaped leaf spring whose spring tip contacts the electrical connection terminal on the actuator side is installed as a power-supply terminal that rises from the power-supply section of the circuit board.

5. The power supply mechanism of a vibrating actuator of claim 1 in which a flexible projection whose tip contacts the electrical connection terminal on the actuator side is installed as a power-supply terminal that rises from the power-supply section of the circuit board.

6. The power supply mechanism of a vibrating actuator of claim 1 in which a double U shaped leaf spring that clenches the electrical connection terminal on the actuator side via the spring tips is installed as a power-supply terminal that rises from the power-supply section of the circuit board.

7. The power supply mechanism of a vibrating actuator of claim 1 in which a leaf spring that is inserted in a holder that engages the side of the case, one tip of which contacts the electrical connection terminal on the actuator side while the other tip contacts the power-supply section of the circuit board, is installed as a power-supply terminal that rises from the power-supply section of the circuit board.

* * * * *